United States Patent
Hirai et al.

(10) Patent No.: US 9,847,518 B2
(45) Date of Patent: Dec. 19, 2017

(54) SEPARATOR WITH HEAT-RESISTANT INSULATION LAYER

(71) Applicant: NISSAN MOTOR CO., LTD., Kanagawa (JP)

(72) Inventors: Tamaki Hirai, Yokohama (JP); Miyuki Nakai, Yokohama (JP); Takashi Honda, Kawasaki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 298 days.

(21) Appl. No.: 14/349,262

(22) PCT Filed: Oct. 2, 2012

(86) PCT No.: PCT/JP2012/075548
§ 371 (c)(1),
(2) Date: Apr. 2, 2014

(87) PCT Pub. No.: WO2013/051574
PCT Pub. Date: Apr. 11, 2013

(65) Prior Publication Data
US 2014/0242443 A1    Aug. 28, 2014

(30) Foreign Application Priority Data
Oct. 5, 2011   (JP) .................. 2011-221243

(51) Int. Cl.
*H01M 2/16* (2006.01)
*H01M 10/0525* (2010.01)

(52) U.S. Cl.
CPC ......... *H01M 2/1686* (2013.01); *H01M 2/166* (2013.01); *H01M 2/1653* (2013.01); *H01M 10/0525* (2013.01); *Y02T 10/7011* (2013.01)

(58) Field of Classification Search
CPC ....................................................... H01M 2/16
See application file for complete search history.

(56) References Cited

U.S. PATENT DOCUMENTS 5,418,091 A * 5/1995 Gozdz ................ C08J 9/28
                                                          429/252
8,530,097 B2   9/2013 Kim et al.
(Continued)

FOREIGN PATENT DOCUMENTS

CN    101546822 A    9/2009
CN    101558513 A    10/2009
(Continued)

OTHER PUBLICATIONS

Notification of reason for refusal KIPO dated Aug. 22, 2016.*
Decision of Refusal for Appl. # 2011221243 (Japanese counterpart of the instant Application) dated Apr. 18, 2017.*
(Continued)

*Primary Examiner* — Alex Usyatinsky
(74) *Attorney, Agent, or Firm* — Young Basile Hanlon & MacFarlane, P.C.

(57) ABSTRACT

A separator with a heat-resistant insulation layer for an electric device includes a resin porous substrate and a heat-resistant insulation layer containing heat-resistant particles and a binder, the heat-resistant insulation layer being formed on at least one surface of the resin porous substrate. The heat-resistant particles contain alumina and a parameter X is 0.018 to 0.336. Parameter X is represented by $X=C_\alpha \times R_{zjis}/D$, wherein $C_\alpha$ is a ratio of the alumina, which occupies the heat-resistant particles, $R_{zjis}$ is surface roughness of a surface of the heat-resistant insulation layer, the surface being opposite the resin porous substrate, and D is a thickness of the heat-resistant insulation layer.

6 Claims, 2 Drawing Sheets

(56) References Cited

U.S. PATENT DOCUMENTS

| | | |
|---|---|---|
| 8,771,859 B2 | 7/2014 | Matsumoto et al. |
| 8,906,537 B2 | 12/2014 | Nishikawa |
| 8,906,538 B2 | 12/2014 | Nishikawa |
| 9,070,935 B2 | 6/2015 | Murata et al. |
| 2006/0194116 A1* | 8/2006 | Suzuki ............... H01M 2/166 429/251 |
| 2006/0269842 A1 | 11/2006 | Ichinose et al. |
| 2007/0264577 A1 | 11/2007 | Katayama et al. |
| 2010/0068612 A1 | 11/2007 | Nishikawa |
| 2009/0067119 A1 | 3/2009 | Katayama et al. |
| 2009/0246614 A1* | 10/2009 | Kim ................... H01M 2/145 429/145 |
| 2009/0246640 A1* | 10/2009 | Bak ................... H01M 2/166 429/246 |
| 2010/0203396 A1* | 8/2010 | Murata ............... H01M 2/1653 429/247 |
| 2011/0143183 A1 | 6/2011 | Matsumoto et al. |
| 2011/0159347 A1* | 6/2011 | Shibano et al. ............. 429/144 |
| 2011/0165450 A1 | 7/2011 | Nishikawa |
| 2011/0165469 A1 | 7/2011 | Nishikawa |
| 2011/0206962 A1* | 8/2011 | Minami ............... H01M 2/1653 429/94 |
| 2011/0206963 A1 | 8/2011 | Fujita et al. |
| 2012/0100411 A1 | 4/2012 | Umehara |

FOREIGN PATENT DOCUMENTS

| | | |
|---|---|---|
| EP | 2 105 981 A1 | 9/2009 |
| JP | 2004-042653 A | 2/2004 |
| JP | 2004-351744 A | 12/2004 |
| JP | 2005-035167 A | 2/2005 |
| JP | 2007-012598 A | 1/2007 |
| JP | 2009238752 A | 10/2009 |
| JP | 2010-149011 A | 7/2010 |
| JP | 2010244875 A | 10/2010 |
| JP | 2011131470 A | 7/2011 |
| JP | 2011165430 A | 8/2011 |
| JP | 2011216257 A | 10/2011 |
| JP | 2012221889 A | 11/2012 |
| KR | 20090103011 A | 10/2009 |
| KR | 20110097725 A | 8/2011 |
| WO | 2007066768 A1 | 6/2007 |
| WO | 2008062727 A1 | 5/2008 |
| WO | 2008149986 A1 | 12/2008 |
| WO | 2010104127 A1 | 9/2010 |
| WO | 2010-128548 A1 | 11/2010 |

OTHER PUBLICATIONS

Extended European Search Report dated Feb. 10, 2015 from corresponding European Application No. 12837904.7.

* cited by examiner

SEPARATOR WITH HEAT-RESISTANT INSULATION LAYER

CROSS REFERENCE TO RELATED APPLICATION

The present application claims priority to Japanese Patent Application No. 2011-221243, filed Oct. 5, 2011 and incorporated herein in its entirety.

TECHNICAL FIELD

The present invention relates to a separator with a heat-resistant insulation layer.

BACKGROUND ART

In recent years, in order to cope with the global warming, it is sincerely desired that the amount of carbon dioxide be reduced. In the automobile industry, expectations are centered on reduction of an emission amount of carbon dioxide by introduction of the electric vehicle (EV) and the hybrid electric vehicle (HEV). And development of an electric device such as a secondary battery for driving a motor, the electric device serving as a key for practical use of these vehicles, is assiduously pursued.

In particular, a lithium ion secondary battery is considered to be suitable for an electric vehicle since an energy density thereof is high and durability thereof against repeated charge/discharge is high. A capacity increase of the lithium ion secondary battery tends to further advance, and it becomes more and more important to ensure safety thereof.

In general, the lithium ion secondary battery has a configuration, in which a positive electrode having a positive electrode active material and the like coated on both surfaces of a positive electrode current collector and a negative electrode having a negative electrode active material and the like coated on both surfaces of a negative electrode current collector are connected to each other through an electrolyte layer having an electrolytic solution or an electrolyte gel held in a separator, and the positive electrode and the negative electrode are housed in a battery case.

As the separator, for example, a polyolefin microporous membrane with a thickness of approximately 20 to 30 μm is frequently used. However, in a case where the polyolefin microporous membrane as described above is used, there is a possibility that there may occur heat shrinkage owing to a temperature rise in the battery and occur a short circuit following this heat shrinkage.

Therefore, in order to suppress the heat shrinkage of the separator, a separator with a heat-resistant insulation layer, in which a heat-resistant porous layer is laminated on a surface of a microporous membrane of resin, is developed. For example, International Publication No. 2007/066768 describes that the heat shrinkage owing to the temperature rise in the battery is suppressed by using such a separator for a wound-type lithium ion battery.

SUMMARY

However, in a case where the separator as described in International Publication No. 2007/066768 is applied, for example, to a flat laminated-type non-aqueous electrolyte secondary battery such as a large lithium secondary battery, powder fall of heat-resistant particles which compose the heat-resistant insulation layer is prone to occur at the time of manufacturing the separator with the heat-resistant insulation layer, and so on. As a result, production efficiency of the secondary battery is lowered.

The present invention has been made in view of such conventional problems. It is an object of the present invention to provide a separator with a heat-resistant insulation layer, in which the powder fall of the heat-resistant particles which compose the heat-resistant insulation layer is suppressed.

Specifically, a separator with a heat-resistant insulation layer, which is according to an aspect of the present invention, includes: a resin porous substrate; and a heat-resistant insulation layer containing heat-resistant particles and a binder, the heat-resistant insulation layer being formed on at least one surface of the resin porous substrate. Then, the separator with a heat-resistant insulation layer is characterized in that the heat-resistant particles contain α alumina, and a parameter X represented by the following mathematical expression 1 is 0.018 to 0.336:

$$X = C_\alpha \times R_{zjis}/D$$

where $C_\alpha$ is a ratio of the α alumina, which occupies the heat-resistant particles, $R_{zjis}$ is surface roughness (μm) of a surface of the heat-resistant insulation layer, which is opposite with the resin porous substrate, and D is a thickness (μm) of the heat-resistant insulation layer.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

While referring to the drawings, a description is made below of embodiments of a separator with a heat-resistant insulation layer for an electric device according to the present invention and of an electric device including the same. However, the technical scope of the present invention should be determined based on the description of the scope of claims, and is not limited only to the following embodiments. Note that the same reference numerals are assigned to the same elements in the description of the drawings, and duplicate descriptions are omitted. Moreover, in this application, a separator with a heat-resistant insulation layer is simply referred to as "separator" in some case.

In the separator with a heat-resistant insulation layer for an electric device, which is a typical embodiment of the present invention, and in the electric device including the same, even if the electric device is a large flat laminated-type electric device, a malfunction is less likely to occur at the time when the respective elements are laminated on one another, and production efficiency of a secondary battery can be prevented from being lowered.

Specifically, the electric device of this embodiment just needs to be the one including the separator with a heat-resistant insulation layer for an electric device, which is according to this embodiment to be described below, and other constituent elements are not particularly limited. A description is made of this embodiment while exemplifying a lithium ion battery as the electric device.

For example, with regard to a usage mode of the lithium ion battery, the lithium ion battery may be used as both of a lithium ion primary battery and a lithium ion secondary battery. Since the lithium ion battery is excellent in cycle durability, preferably, it is desirable that the lithium ion battery be used as a lithium ion secondary battery for a drive power supply of a vehicle, a portable instrument such as a cellular phone, and the like.

The above-described separator with a heat-resistant insulation layer is not particularly limited for the usage mode, and is suitably applicable also for a flat laminated-type (flat-type) battery. In a case of adopting a flat laminated-type (flat-type) battery structure, advantages in terms of cost and in terms of workability are particularly brought since long-term reliability can be ensured by a simple sealing technology such as thermocompression bonding.

Moreover, in a case of viewing the lithium ion battery in terms of an electric connection mode (electrode structure) therein, the separator is applicable to both of a non-bipolar (internal parallel connection-type) battery and a bipolar (internal serial connection-type) battery.

In a case of distinguishing the lithium ion battery based on a type of an electrolyte layer therein, the separator is also applicable to an electrolyte layer of a solution electrolyte battery in which a solution electrolyte such as a non-aqueous electrolytic solution is used for the electrolyte layer, of a gel electrolyte battery in which a polymer gel electrolyte is used for the electrolyte layer, or of the like.

In the following description, by using the drawings, there is briefly described a non-bipolar (internal parallel connection-type) lithium ion secondary battery composed by using the separator with a heat-resistant insulation layer for a lithium ion secondary battery, which is according to this embodiment. However, the technical scope of the present invention should not be limited to these.

<Overall Structure of Battery>

Figure 1:
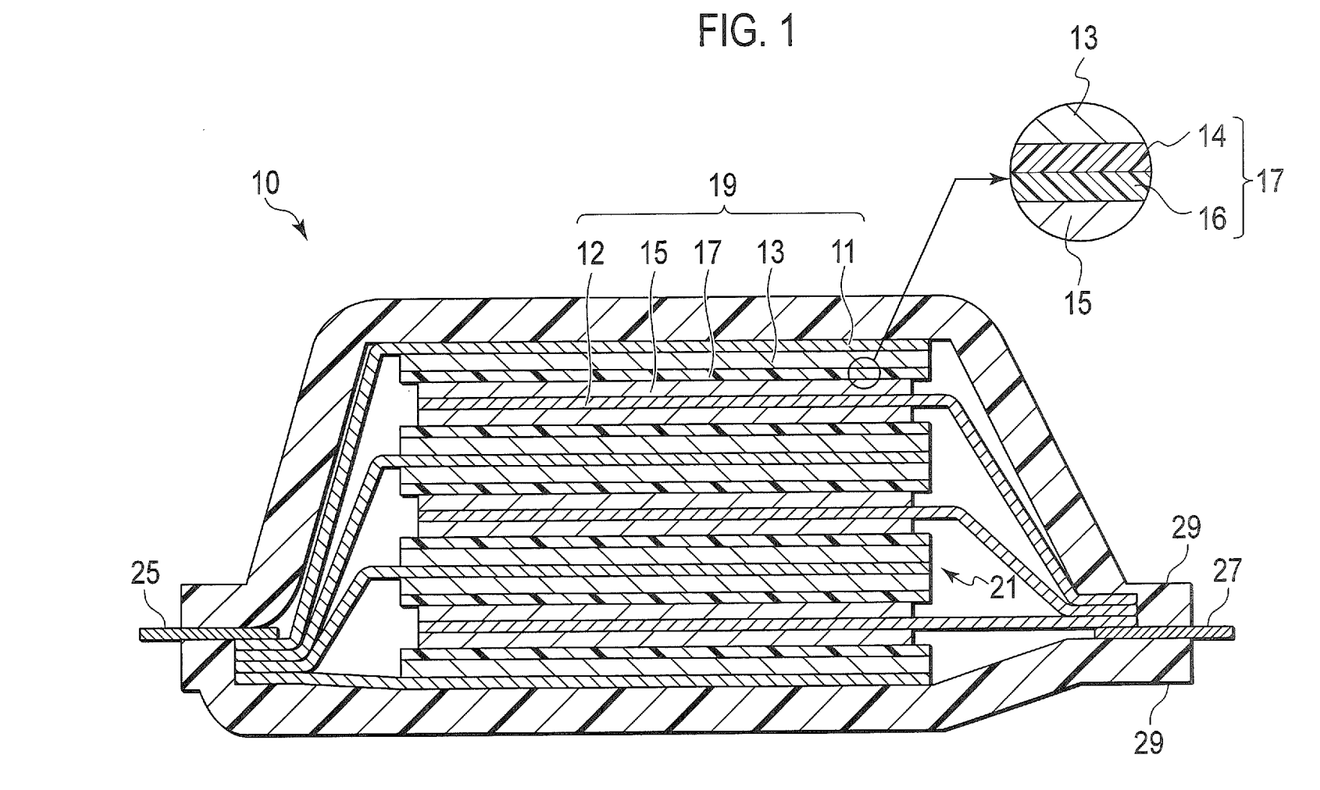
FIG. 1 is a schematic cross-sectional view schematically showing an outline of a flat laminated-type non-bipolar lithium ion secondary battery as a typical embodiment of the present invention.

FIG. 1 is a schematic cross-sectional view schematically showing an overall structure of a flat laminated-type (flat-type) lithium ion secondary battery as a typical embodiment of the present invention. Note that, in this application, the flat laminated-type (flat-type) lithium ion secondary battery is simply referred to as "laminated battery" in some case.

As shown in FIG. 1, a laminated battery 10 of this embodiment has a structure, in which a substantially rectangular power generation element 21 in which a charge/discharge reaction actually progresses is sealed in an inside of laminated sheets 29 as package bodies. Here, the power generation element 21 has a configuration, in which positive electrodes each having positive electrode active material layers 13 arranged on both surfaces of a positive electrode current collector 11, electrolyte layers 17 each having an electrolytic solution or an electrolyte gel held in a separator, and negative electrodes each having negative electrode active material layers 15 arranged on both surfaces of a negative electrode current collector 12 are laminated on one another. Specifically, the negative electrodes, the electrolyte layers and the positive electrodes are laminated on one another in this order so that one of the positive electrode active material layers 13 and the negative electrode active material layer 15 adjacent thereto can be opposed to each other while interposing the electrolyte layer 17 therebetween.

In such a way, the positive electrode, the electrolyte layer and the negative electrode, which are adjacent to one another, compose one single cell layer 19. Hence, it can also be said that the laminated battery 10 shown in FIG. 1 has a configuration composed in such a manner that a plurality of the single cell layers 19 are electrically connected in parallel to one another by being laminated on one another. Note that, with regard to each of the outermost positive electrode current collectors located on both outermost layers of the power generation elements 21, the positive electrode active material layer 13 is arranged only on one surface thereof; however, such active material layers may be provided on both surfaces thereof. That is to say, each of the outermost current collectors is not formed as a current collector, which has the active material layer provided only on one surface thereof and is dedicated for the outermost layer, but such a current collector having the active material layers on both surface thereof may be directly used as each of the outermost current collectors. Moreover, such arrangement of the positive electrode and the negative electrode is inverted from that of FIG. 1, whereby the negative electrode current collectors may be located on both outermost layers of the power generation element 21, and the negative electrode active material layer may be arranged on one surface or both surfaces of the negative electrode current collector on each of the outermost layers.

The positive electrode current collectors 11 and the negative electrode current collectors 12 have structures, in which a positive electrode current collector plate 25 and a negative electrode current collector plate 27, which are to be conducted to the respective electrodes as the positive electrodes and the negative electrodes, are attached thereto, respectively, and are drawn out to an outside of the laminated sheets 29 like being sandwiched by end portions of the laminated sheets 29. The positive electrode current collector plate 25 and the negative electrode current collector plate 27 may be attached to the positive electrode current collectors 11 and negative electrode current collectors 12 of the respective electrodes by ultrasonic welding, resistance welding or the like while interposing a positive electrode lead and a negative electrode lead (not shown) therebetween, respectively, according to needs.

The lithium ion secondary battery described above has a feature in the separator. A description is made below of main constituent members of the battery, which includes the separator concerned.

(Current collector) The current collectors 11 and 12 are composed of a conductive material. A size of the current collectors is determined in response to a usage purpose of the battery. For example, if the current collectors are used for a large battery for which a high energy density is required, then current collectors with a large area are used. The lithium ion battery of this embodiment is preferably a large battery, and with regard to the size of the current collectors for use, for example, a long side thereof is 100 mm or more, preferably, the size is 100 mm×100 mm or more, more preferably, 200 mm×200 mm or more. A thickness of the current collectors is not particularly limited, either. The thickness of the current collectors is approximately 1 to 100 µm in usual. A shape of the current collectors is not particularly limited, either. In the laminated battery 10 shown in FIG. 1, the current collectors with a mesh-like shape (expand grid and the like) can be used besides current collector foil.

A material that composes the current collectors is not particularly limited; however, metal can be suitably employed. Specifically, aluminum nickel, iron, stainless steel, titanium, copper and the like are mentioned. Besides these, a cladding material of nickel and aluminum, a cladding material of copper and aluminum, a plated material as a combination of these metals, and the like can be preferably used. Moreover, the current collectors may be foil formed in such a manner that aluminum is coated on surfaces of metals. Among them, aluminum, stainless steel and copper are preferable from viewpoints of electron conductivity and a battery operation potential.

(Active material layer) The positive electrode active material layers 13 or the negative electrode active material layers 15 contain an active material, and further contain other additives according to needs.

The positive electrode active material layers 13 contain a positive electrode active material. As the positive electrode active material, for example, there are mentioned a lithium-transition metal composite oxide, a lithium-transition metal phosphate compound, a lithium-transition metal sulfate compound, and the like, which include, for example, $LiMn_2O_4$, $LiCoO_2$, $LiNiO_2$, $Li(Ni-Co-Mn)O_2$, those in which other elements are partially substituted for these transition metals, and the like. Depending on the case, two types or more of the positive electrode active material may be used in combination. Preferably, the lithium-transition metal composite oxide is used as the positive electrode active material from viewpoints of a capacity and output characteristics. Note that, as a matter of course, positive electrode active materials other than those described above may be used.

The negative electrode active material layers 15 contain a negative electrode active material. As the negative electrode active material, for example, there are mentioned: a carbon material such as graphite (black lead), soft carbon and hard carbon; a lithium-transition metal composite oxide, for example, such as $Li_4Ti_5O_{12}$; a metal material; a lithium alloy-based negative electrode active material; and the like. Depending on the case, two types or more of the negative electrode active material may be used in combination. Preferably, the carbon material or the lithium-transition metal composite oxide is used as the negative electrode active material from viewpoints of the capacity and the output characteristics. Note that, as a matter of course, negative electrode active materials other than those described above may be used.

Average particle diameters of the respective active materials contained in the respective active material layers are not particularly limited; however, are preferably 1 to 100 μm, more preferably 1 to 20 μm from a viewpoint of enhancement of the output.

Preferably, the positive electrode active material layers 13 and the negative electrode active material layers 15 contain a binder.

The binder for use in the active material layers is not particularly limited; however, for example, there are mentioned: thermoplastic polymers such as polyethylene, polypropylene, polyethylene terephthalate (PET), polyether nitrile, polyacrylonitrile, polyimide, polyamide, cellulose, carboxymethyl cellulose (CMC), an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof; fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinylidene fluoride (PVF); vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TEF-based rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); epoxy resin; and the like. Among them, more preferably, the binder is polyvinylidene fluoride, polyimide, styrene-butadiene rubber, carboxymethyl cellulose, polypropylene, polytetrafluoroethylene, polyacrylonitrile, and polyamide. These preferred binders are excellent in heat resistance, further have extremely wide potential windows, are stable at both of the positive electrode potential and the negative electrode potential, and are usable for the active material layers. These binders may be each used singly, or two or more thereof may be used in combination.

An amount of the binder contained in the electrode active material layer is not particularly limited as long as the binder can bind the active materials; however, is preferably 0.5 to 15 mass %, more preferably 1 to 10 mass % with respect to the active material layers.

As other additives which can be contained in the active material layers, for example, there are mentioned a conductive assistant, an electrolyte, an ion conductive polymer, and the like.

The conductive assistant refers to an additive to be blended in order to enhance conductivity of the positive electrode active material layer or the negative electrode active material layer. As the conductive assistant, there are mentioned carbon materials including carbon black such as acetylene black, graphite, carbon fiber and the like. When the active material layers contain the conductive assistant, an electron network in an inside of each of the active material layers is formed effectively, and this can contribute to enhancement of the output characteristics of the battery.

As the electrolyte (lithium salt), there are mentioned $Li(C_2F_5SO_2)_2N$, $LiPF_6$, $LiBF_4$, $LiClO_4$, $LiAsF_6$, $LiCF_3SO_3$, and the like.

As the ion conductive polymer, for example, polyethylene oxide (PEO)-based and polypropylene oxide (PPO)-based polymers are mentioned.

A blending ratio of such components contained in the positive electrode active material layer and the negative electrode active material layer is not particularly limited. The blending ratio can be adjusted by appropriately referring to the publicly known knowledge about the non-aqueous electrolyte secondary. A thickness of each of the active material layers is not particularly limited, and the knowledge about the battery, which has been heretofore known in public, can be referred to as appropriate. An example of the thickness of each of the active material layers is approximately 2 to 100 μm.

(Electrolyte layer) The electrolyte layers 17 each have a configuration composed in such a manner that an electrolyte is held in a planar center portion of the separator according to this embodiment, which serves as a base material. By using the separator according to this embodiment, an occurrence of a curl at an end portion at the time of lamination can be suppressed, and accordingly, a highly reliable battery can be manufactured stably.

[Separator with Heat-Resistant Insulation Layer (Separator)]

In this embodiment, as shown in FIG. 1, the separator includes: a resin porous substrate 16; and a heat-resistant insulation layer 14 containing heat-resistant particles and a binder, the heat-resistant insulation layer 14 being formed on at least one surface of the resin porous substrate 16. It is characterized in that the separator with a heat-resistant insulation layer 14 is used, in which the heat-resistant particles contain a alumina, and a parameter X represented by the above-described mathematical expression 1 is 0.018 to 0.336.

In accordance with the separator according to this embodiment, peel strength of the heat-resistant insulation layer is enhanced. Therefore, when the separator according to this embodiment is used, an occurrence of powder fall of the heat-resistant particles can be suppressed in a manufacturing process of the flat laminated-type battery. Meanwhile, in a case where a value of the above-described parameter X is less than 0.018, or in a case where the value is larger than 0.36, the above-described peel strength is lowered, and the powder fall of the heat-resistant particles becomes prone to occur. This is considered to be because adhesion force among the heat-resistant particles or between the heat-resistant insulation layer and the resin porous substrate is reduced.

In the separator according to this embodiment, the above-described parameter X is preferably 0.04 to 0.33, particularly preferably 0.07 to 0.30.

In accordance with the separator according to this embodiment, the above-described $C_\alpha$ stands for a ratio of a peak area of the α alumina contained in the whole of the heat-resistant particles, the peak area being measured by an X-ray diffraction analysis (XRD). That is to say, the above-described $C_\alpha$ can be obtained as a relative value of the peak area of the α alumina in a case where a peak area of the whole of the above-described heat-resistant particles is defined as 1. The above-described $C_\alpha$ is preferably 0.06 or more. In a case where the above-described $C_\alpha$ is 0.06 or more, aggregation property of the α alumina is increased, and the adhesion force among the heat-resistant particles which compose the heat-resistant insulation layer and between the heat-resistant insulation layer and the resin porous substrate is enhanced. The above-described $C_\alpha$ is preferably 0.11 or more, particularly preferably 0.28 or more.

In the separator according to this embodiment, the above-described surface roughness $R_{zjis}$ is preferably 1.3 to 1.75 μm, more preferably, 1.3 to 1.7 μm, particularly preferably 1.3 to 1.6 μm. When the surface roughness is 1.3 to 1.75 μm, adhesion property between the separator and the positive electrode active material and the separator and the negative electrode active material is enhanced.

In the separator according to this embodiment, a parameter Y represented by the following mathematical expression 2, which is a mass ratio of the heat-resistant particles and the binder, which are contained in the above-described heat-resistant insulation layer, is preferably 5.6 to 99:

$$Y = A/B$$

where A is a mass (g) of the heat-resistant particles contained in the heat-resistant insulation layer, and B is a mass (g) of the binder contained in the above-described heat-resistant insulation layer.

In the separator according to this embodiment, in a case where the above-described parameter Y is 5.6 to 99, the adhesion force among the heat-resistant particles which compose the heat-resistant insulation layer and between the heat-resistant insulation layer and the resin porous substrate is enhanced, and the peel strength of the heat-resistant insulation layer is enhanced.

A description is made below of the separator according to this embodiment more in detail.

[Resin Porous Substrate]

As the resin porous substrate, for example, there can be mentioned a porous sheet, woven fabric or nonwoven fabric, which contains organic resin that absorbs and holds the above-described electrolytic solution. Preferably, the above-described porous sheet is a microporous membrane composed of a microporous polymer. As such a polymer, for example, there are mentioned: polyolefin such as polyethylene (PE) and polypropylene (PP); a laminated body having a three-layer structure of PP/PE/PP; polyimide; aramid; and the like. In particular, a polyolefin-based microporous membrane is preferable since property thereof is chemical stability to an organic solvent, and reactivity thereof to the electrolytic solution can be suppressed to be low.

A thickness of the above-described porous sheet differs depending on the purpose, and accordingly, cannot be uniquely defined. However, in the purpose of the secondary battery for driving the motor of the vehicle, the thickness is desirably 4 to 60 μm in a single layer or a multiple layer. Desirably, a micropore diameter of the above-described porous sheet is at most 1 μm or less (in usual, the pore diameter is approximately 10 nm), and porosity thereof is 20 to 80%.

As the woven fabric or the nonwoven fabric, there are usable those heretofore known in public, which include: polyester such as polyethylene terephthalate (PET); polyolefin such as PP and PE; polyimide; aramid; and the like. A bulk density of the woven fabric or the nonwoven fabric just needs to make it possible to obtain sufficient battery characteristics by the electrolytic solution impregnated therein, and is not particularly limited. Preferably, the porosity of the woven fabric or the nonwoven fabric is 50 to 90%. Moreover, the thickness of the woven fabric or the nonwoven fabric is preferably 5 to 200 μm, particularly preferably 5 to 100 μm. If the thickness is 5 μm or more, then holding property of the electrolyte is favorable, and if the thickness is 100 μm or less, then resistance is less likely to increase excessively.

A preparation method of the resin porous substrate is not particularly limited. In a case of a polyolefin-based microporous membrane, for example, first, polyolefin is dissolved in a solvent such as paraffin, liquid paraffin, paraffin oil, tetralin, ethylene glycol, glycerin and decalin. Thereafter, the dissolved polyolefin is extruded into a sheet shape, the solvent is removed therefrom, and an obtained sheet is subjected to uniaxial stretching or biaxial stretching. By such a method, the resin porous substrate can be prepared.

[Heat-Resistant Insulation Layer]

In this embodiment, as a material of the heat-resistant particles which compose the heat-resistant insulation layer, there is used the one with high heat resistance, in which a melting point or a heat softening point is 150° C. or more, preferably 240° C. or more. By using such a material with high heat resistance, shrinkage of the separator can be prevented effectively even if an internal temperature of the battery nearly reaches 150° C. As a result, induction of an inter-electrode short circuit of the battery can be prevented, and accordingly, a battery, in which performance lowering owing to a temperature rise is less likely to occur, is obtained.

Moreover, preferably, the above-described heat-resistant particles have electrical insulating property, are stable to the electrolytic solution and a solvent for use in the event of manufacturing the heat-resistant insulation layer, and further, are so electrochemically stable as to be less likely to be oxidized/reduced in an operation voltage range of the battery. The above-described heat-resistant particles may be either organic particles or inorganic particles; however, preferably, are inorganic particles from a viewpoint of stability. Moreover, preferably, the above-described heat-resistant particles are microparticles from a viewpoint of dispersibility, and microparticles with a secondary particle diameter of 500 nm to 3 μm can be preferably used. A form of the above-described heat-resistant particles is not particularly limited, either, and may be a form approximate to sphere or ellipsoid, a plate-like, stick-like or needle-like form, or a form in which these forms are integrated with each other. The above-described form approximate to the sphere or the ellipsoid include, for example, forms of a rugby ball, a spindle, a double ball, a grape cluster, and the like.

The inorganic particles (inorganic powder) with the melting point or the heat softening point of 150° C. or more just need to contain at least the α alumina, and may contain other inorganic particles. The other inorganic particles are not particularly limited; however, for example, there are mentioned particles which are formed of: inorganic oxides including iron oxide represented by $Fe_xO_y$ such as $Fe_2O_3$ and $Fe_3O_4$, $SiO_2$, alumina ($Al_2O_3$) other than the α alumina, such as β alumina and γ alumina, aluminosilicate, $TiO_2$, $BaTiO_2$, $ZrO_2$, and the like; inorganic nitrides including aluminum nitride, silicon nitride and the like; insoluble ionic crystals including calcium fluoride, barium fluoride, barium sulfate and the like; covalent bond crystals including silicon, diamond and the like; clay including montmorillonite and the like. The above-described inorganic oxide may be mineral resource-derived substances such as boehmite, zeolite, apatite, kaolin, mullite, spinel, olivine and mica, artificial products of these, or the like. Moreover, the above-described inorganic particles may be particles, in which the electrical insulating property is imparted to a surface of a conductive material by coating the surface with a material having the electrical insulating property. The above-described conductive material is exemplified, for example, by metal; conductive oxides such as $SnO_2$ and tin-indium oxide (ITO); carbon materials such as carbon black and graphite; and the like, and the above-described material having the electrical insulating property is, for example, the above-described inorganic oxide. In particular, the particles of the inorganic oxides can be easily coated as water dispersion slurry on the resin porous substrate, and accordingly, can fabricate the separator by a simple method, and is suitable. Among the inorganic oxides, the alumina is further preferable, and the α alumina is particularly preferable.

A mode in which the α alumina is contained as the inorganic particles is not particularly limited. For example, the individual alumina particles contained in the inorganic particles may contain both of the α alumina and the other alumina (β alumina, γ alumina and the like). Moreover, a mixture of alumina particles composed of only the α alumina and of alumina particles composed of only the alumina other than the α alumina may be used as the inorganic particles. Furthermore, as long as the above-mentioned mode is satisfied, inorganic particles of a substance other than the alumina may be further contained. Even in any of these cases, it is possible to measure the ratio ($C_α$) of the α alumina, which occupies the inorganic particles, in accordance with the technique mentioned above.

As the organic particles (organic powder) with the melting point or the heat softening point of 150° C. or more, there can be exemplified: a variety of cross-linked polymer particles of cross-linked polymethyl methacrylate, cross-linked polystyrene, cross-linked poly divinyl benzene, a cross-linked product of a styrene-divinyl benzene copolymer, polyimide, melamine resin, phenol resin, a benzoguanamine-formaldehyde condensate, and the like; and particles of organic resin, such as heat-resistant polymer particles of polysulfone, polyacrylonitrile, polyaramide, polyacetal, and thermoplastic polyimide. Moreover, the organic resin (polymer) that composes these organic particles may be a mixture of the materials exemplified above, a modified product thereof, a derivative thereof, and a copolymer thereof, which includes a random copolymer, an alternating copolymer, a block copolymer and a graft copolymer, and a cross-linked product in a case of the above-described heat-resistant polymer microparticles. Among them, it is desirable to use particles of the cross-linked polymethyl methacrylate or the polyaramide as the organic particles from viewpoints of industrial productivity and electrochemical stability. By using the particles of the organic resin as described above, a separator which mainly contains resin can be fabricated, and accordingly, a battery, which is lightweight as a whole, can be obtained.

Note that the heat-resistant particles as mentioned above may be each used singly, or two or more thereof may be used in combination.

A thickness of each of the heat-resistant insulation layers composed by using the above-described heat-resistant particles should be appropriately determined in response to the type, purpose and the like of the battery, and should not be particularly limited. For example, a total thickness of the heat-resistant insulation layers to be formed on both surfaces of the resin porous substrate is approximately 5 to 200 μm. In particular, in the purpose such as the secondary battery for driving the motor of the electric vehicle (EV), the hybrid electric vehicle (HEV) or the like, the total thickness of the heat-resistant insulation layers to be formed on both surfaces of the resin porous substrate can be set, for example, at 4 to 200 μm. The total thickness is preferably 4 to 20 μm, more preferably 4.5 to 10 μm. The thickness of the heat-resistant insulation layer stains within such a range, whereby the enhancement of the output can be ensured while increasing mechanical strength in a thickness direction.

Porosity of the heat-resistant insulation layers composed by using the above-described heat-resistant particles is not particularly limited; however, is preferably 40% or more, more preferably 50% or more from a viewpoint of ion conductivity. Moreover, if the porosity is 40% or more, then the holding property of the electrolytic solution and the electrolyte gel is enhanced, and a battery with a high output can be obtained. Moreover, the porosity of the above-described heat-resistant insulation layers is preferably 70% or less, more preferably 60% or less. If the porosity of the above-described heat-resistant insulation layers is 70% or less, then sufficient mechanical strength is obtained, and an effect of preventing a short circuit, which may be caused by foreign objects, is high.

[Manufacturing Method]

A manufacturing method of the separator according to this embodiment is not particularly limited. For example, there can be used a method, in which a slurry-like composition for forming the heat-resistant insulation layer, the composition containing the heat-resistant particles with the melting point or the heat softening point of 150° C. or more, is coated on both surfaces of the resin porous substrate, followed by drying.

Such a heat-resistant insulation layer-forming composition is a composition obtained by dispersing the heat-resistant particles into the solvent, and may further contain an organic binder according to needs. As the organic binder for enhancing shape stability of the heat-resistant insulation layer, for example, there are mentioned carboxymethyl cellulose, hydroxyethyl cellulose, polyvinyl alcohol, polyvinyl butyral, polyvinyl pyrrolidone and the like. In a case where the organic binder is contained, a usage amount of the above-described organic binder is preferably 10 mass % or less, more preferably 5 mass % or less with respect to a total mass of the above-described heat-resistant particles and the above-described organic binder. The solvent is not particularly limited as long as being capable of uniformly dispersing the heat-resistant particles. For example, there are mentioned: water; aromatic hydrocarbons such as toluene; furans such as tetrahydrofuran; ketones such as methylethylketone and methylisobutylketone; N-methylpyrrolidone; dimethylacetamide and dimethylformamide; dimethylsulfoxide; and the like. Ethylene glycol, propylene glycol, monomethyl acetate and the like may be appropriately added to these solvents for the purpose of controlling interfacial tension. Particularly in a case of using inorganic oxide particles as the above-described heat-resistant particles, the water dispersion slurry is prepared by using water as the solvent, whereby the heat-resistant insulation layer can be fabricated with ease. Moreover, with regard to the heat-resistant insulation layer-forming composition, preferably, a solid content concentration thereof is adjusted at 30 to 60 mass %.

Total weight per unit area (weight (g) per 1 $m^2$) of the heat-resistant insulation layer-forming composition in the event of coating the same on the resin porous substrate is not particularly limited; however, is preferably 5 to 20 $g/m^2$, more preferably 9 to 13 $g/m^2$. If the total weight is within the above-described range, then a heat-resistant insulation layer, which has appropriate porosity and thickness, can be obtained. A coating method of the above-described composition is not particularly limited, either, and for example, there are mentioned a knife coater method, a gravure coater method, a screen printing method, a mayer bar method, a die coater method, a reverse roll coater method, an ink-jet method, a spray method, a roll coater method and the like.

A method of drying the heat-resistant insulation layer-forming composition, which is already coated, is not particularly limited, either; however, for example, such a method as warm-air drying can be used. A drying temperature is, for example, 30 to 80° C., and a drying time is, for example, 2 seconds to 50 hours.

A total thickness of the separator thus obtained is not particularly limited; however, the separator is usually usable as long as the total thickness concerned is approximately 5 to 30 µm. In order to obtain a compact battery, preferably, the total thickness is thinned as much as possible within a range where a function as the electrolyte layer can be ensured, and in order to contribute to the enhancement of the battery output by thinning the separator, the total thickness of the separator is preferably 20 to 30 µm, more preferably 20 to 25 µm.

The electrolyte layer is not particularly limited as long as being formed by using the separator of this embodiment. In response to the usage purpose of the electrolyte layer, an electrolytic solution-containing separator excellent in ion conductivity can be used as the electrolyte layer, and moreover, an electrolyte layer formed by performing impregnation, coating, spraying and so on for a polymer gel electrolyte or the like on the separator can also be suitably used.

(a) Electrolytic solution-containing separator: With regard to the electrolytic solution capable of being infiltrated into the separator to this embodiment, as the electrolyte, there is used at least one of $LiClO_4$, $LiAsF_6$, $LiPF_5$, LiBOB, $LiC.e_3SO_3$ and $Li(CF_3SO_2)_2$, and as the solvent, there is used at least one from ethers consisting of ethylene carbonate (EC), propylene carbonate, diethyl carbonate (DEC), dimethyl carbonate, methylethyl carbonate, 1,2-dimethoxyethane, 1,2-diethoxyethane, tetrahydrofuran, 1,3-dioxolane and γ-butyrolactone. Then, the electrolytic solution is a solution in which a concentration of the electrolyte is adjusted to 0.5 to 2 M in such a manner that the above-described electrolyte is dissolved into the above-described solvent; however, the present invention should never be limited to these.

The above-described separator is the one which uses the separator according to this embodiment, which is already described, and accordingly, a description thereof here is omitted.

With regard to an amount of the electrolytic solution which the above-described separator is allowed to hold by the impregnation and the like, the electrolytic solution just needs to be impregnated, coated and so on to a liquid holding capability range of the separator; however, may also be impregnated beyond the liquid holding capability range concerned. A reason for this is as follows. For example, in the case of the bipolar battery, seepage of the electrolytic solution from the electrolyte layer can be prevented by injecting resin into an electrolyte sealing portion, and accordingly, it is possible to impregnate the electrolytic solution if the amount thereof is within a range of being capable of being held in the separator of the electrolyte layer concerned. In a similar way, in the case of the non-bipolar battery, the seepage of the electrolytic solution from an inside of a package material of the battery can be prevented by sealing the battery element into the package material of the battery, and accordingly, it is possible to impregnate the electrolytic solution if the amount thereof is within a range of being capable of being held in the inside of the package material of the battery. The electrolytic solution concerned can be completely sealed after being injected by a vacuum liquid injection method and the like, and in such a way, can be impregnated into the separator by a method heretofore known in public.

(b) Gel electrolyte layer: A gel electrolyte layer of the present invention is composed by holding the gel electrolyte in the separator according to this embodiment by the impregnation, the coating and the like.

The gel electrolyte has a configuration composed in such a manner that the above-described liquid electrolyte (electrolytic solution) is injected into a matrix polymer made of an ion conductive polymer. As the ion conductive polymer to be used as the matrix polymer, for example, there are mentioned polyethylene oxide (PEO), polypropylene oxide (PPO), copolymers of these, and the like. Electrolyte salt such as lithium salt can be dissolved well into such a polyalkylene oxide-based polymer.

A ratio of the above-described liquid electrolyte (electrolytic solution) in the gel electrolyte should not be particularly limited; however, desirably, is set at approximately several mass % to 98 mass % from viewpoints of the ion conductivity and the like. This embodiment is particularly effective for a gel electrolyte, in which a ratio of the electrolytic solution is as large as 70 mass % or more.

The matrix polymer of the gel electrolyte can express excellent mechanical strength by forming a cross-linked structure. In order to form the cross-linked structure, a polymerizable polymer (for example, PEO and PPO) for forming a polymer electrolyte just needs to be subjected to polymerization treatment such as thermal polymerization, ultraviolet polymerization, radiation polymerization and electron beam polymerization by using an appropriate polymerization initiator.

A thickness of the electrolyte layer is not particularly limited; however, basically, is substantially equal to or a little thicker than the thickness of the separator according to this embodiment, and in usual, the electrolyte layer is usable if the thickness thereof is approximately 5 to 30 µm.

Note that, in the present invention, a variety of additives, which have been heretofore known in public, may be contained in the electrolytic solution of the above-described electrolyte layer as long as an amount of each thereof is within a range where the functions and effects of the present invention are not damaged.

(Current collector plate and lead) The current collector plates may be used for the purpose of taking out a current to the outside of the battery. Each of the current collector plates is electrically connected to the current collectors and the leads, and is taken out to the outside of the laminated sheets as the battery package material.

A material that composes the current collector plate is not particularly limited, and a publicly known highly conductive material heretofore used as the current collector plate for the lithium ion secondary battery can be used. As a constituent material of the current collector plate, for example, a metal material such as aluminum, copper, titanium, nickel, stainless steel (SUS) and alloys of these is preferable, and aluminum, copper and the like are more preferable from viewpoints of light weight, durability and high conductivity. Note that, for the positive electrode current collector plate and the negative electrode current collector plate, the same material may be used, or different materials may be used.

A positive electrode terminal lead and a negative electrode terminal lead are also used according to needs. As a material of the positive electrode terminal lead and the negative electrode terminal lead, a terminal lead to be used in the publicly known lithium ion secondary battery can be used. Note that, preferably, portions taken out from such battery package materials 29 are covered with heat-resistant insulation heat shrinkage tubes and the like so as not to affect the product (for example, an automotive component, and in particular, an electronic instrument or the like) by causing electric leakage as a result of contact with a peripheral instrument, a wire or the like.

(Battery package material) As such a battery package material 29, a metal can case publicly known can be used, and moreover, a bag-like case using a laminated film containing aluminum, the case being capable of covering the power generation element, can be used. As the laminated film concerned, for example, a laminated film with a three-layer structure composed by laminating PP, aluminum and Nylon on one another in this order, and the like can be used; however, the laminated film is never limited to these. The laminated film is desirable from viewpoints that the laminated film is excellent in enhancement of the output and in cooling performance, and can be suitably used for a battery for a large instrument such as an EV and an HEV.

Note that the above-described lithium ion secondary battery can be manufactured by a manufacturing method heretofore known in public.

<Exterior Appearance Configuration of Lithium Ion Secondary Battery>

Figure 2:
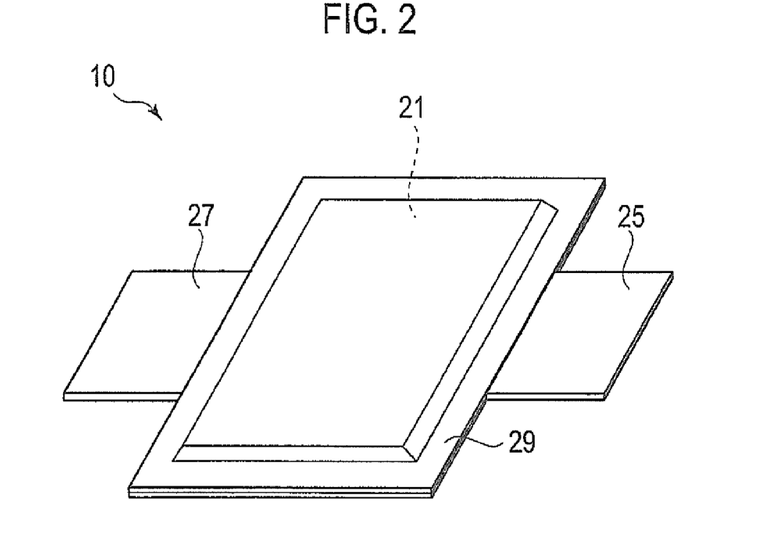
FIG. 2 is a perspective view schematically showing an exterior appearance of the flat laminated-type non-bipolar lithium ion secondary battery as the typical embodiment of the present invention.

FIG. 2 is a perspective view showing an exterior appearance of the flat laminated-type lithium ion secondary battery. As shown in FIG. 2, the flat laminated-type lithium ion secondary battery 10 has a rectangular flat shape, and from both side portions thereof, the positive electrode current collector plate 25 and the negative electrode current collector plate 27, which are for taking out electric power, are drawn out. The power generation element 21 is wrapped by the battery package material 29 of the lithium ion secondary battery 10, and a periphery thereof is thermally fused, and the power generation element 21 is hermetically sealed in a state where the positive electrode current collector plate 25 and the negative electrode current collector plate 27 are drawn to the outside.

Moreover, such drawing out of the current collector plates 25 and 27 shown in FIG. 2 is not particularly limited, either. The positive electrode current collector plate 25 and the negative electrode current collector plate 27 may be drawn out from the same side, and each of the positive electrode current collector plate 25 and the negative electrode current collector plate 27 may be divided into plural pieces, and may be drawn out from the respective sides. As described above, the drawing out of the current collector plates 25 and 27 is not limited to that shown in FIG. 2.

Note that, in the above-described embodiment, the lithium ion secondary battery is exemplified as the electric device; however, no limitations are imposed thereon, and the present invention can also be applied to other types of the secondary batteries, and further to a primary battery. Moreover, the present invention can be applied not only to the batteries but also to capacitors.

EXAMPLES

A description is specifically made below of the present invention based on examples. Note that the technical scope of the present invention is not limited only to these examples.

In each of the examples of the present invention, the ratio ($C_\alpha$) of the α alumina, which occupied the heat-resistant particles composing each of the separators with the heat-resistant insulation layer, and the surface roughness (ten-point average roughness ($R_{zjis}$)) of the surface of each of the separators with the heat-resistant insulation layer, were measured in such a manner as follows.

<Measurement of $C_\alpha$>

$C_\alpha$ was measured by using an X-ray diffraction device (MXP18VAHF made by Bruker AXS (former Mac Science) GmbH). With regard to measurement conditions, the Cu-Kα ray was used as an X-ray, a voltage was set at 40 kV, a current was set at 200 mA, and the ratio ($C_\alpha$) of the peak area of the α alumina contained in the whole of the heat-resistant particles composing the heat-resistant insulation layer was calculated.

<Measurement of Surface Roughness>

A laser microscope image of a surface of the heat-resistant insulation layer on an opposite side with the resin porous substrate in each of the separators with the heat-resistant insulation layers was imaged by using LEXT-OLS3000 made by Olympus Corporation, and the ten-point average roughness ($R_{zjis}$) was calculated by using the following mathematical expression 3.

$$R_{zjis} = \frac{1}{5}\sum_{j=1}^{5}(Z_{pj} + Z_{vj})$$

wherein:$R_{zjis}$: sum of average height of highest profile peak to fifth-highest profile peak in profile peaks in roughness curve and of average depth of lowest profile valley to fifth-lowest profile valley in profile valleys therein $Z_{pj}$: the height of j-th-highest profile peak in profile peaks in roughness curve $Z_{vj}$: the depth of j-th lowest profile valley in profile valleys in roughness curve Example 1

95 mass parts of alumina particles ($C_a$=0.07) as the heat-resistant particles and 5 mass parts of carboxymethyl cellulose (made by Daicel Corporation) were uniformly dispersed into an appropriate amount of water, whereby a fluid dispersion was obtained. The fluid dispersion concerned was coated on one surface of polyethylene (PE: film thickness of 17.8 μm) as the resin porous substrate by using a gravure coater, whereby a coated film was obtained. The coated film concerned was dried by warm air, whereby a separator with a heat-resistant insulation layer was fabricated, in which a thickness of the heat-resistant insulation layer was 5.3 μm, and ten-point average roughness of the heat-resistant insulation layer was 1.45 μm.

Example 2

A separator with a heat-resistant insulation layer was fabricated in a similar way to Example 1 except that alumina particles with $C_\alpha$ of 0.1 were used.

Example 3

A separator with a heat-resistant insulation layer was fabricated in a similar way to Example 1 except that alumina particles with $C_\alpha$ of 0.15 were used.

Example 4

A separator with a heat-resistant insulation layer was fabricated in a similar way to Example 1 except that alumina particles with $C_\alpha$ of 0.2 were used.

Example 5

A separator with a heat-resistant insulation layer was fabricated in a similar way to Example 1 except that alumina particles with $C_\alpha$ of 0.33 were used, that the thickness of the heat-resistant insulation layer of the separator with a heat-resistant insulation layer was set at 8.9 μm, and that the ten-point average roughness of the heat-resistant insulation layer was set at 2.97 μm.

Example 6

A separator with a heat-resistant insulation layer was fabricated in a similar way to Example 1 except that alumina particles with $C_\alpha$ of 0.43 were used.

Example 7

A separator with a heat-resistant insulation layer was fabricated in a similar way to Example 1 except that alumina particles with $C_\alpha$ of 0.68 were used, and that the ten-point average roughness of the heat-resistant insulation layer of the separator with a heat-resistant insulation layer was set at 1.46 μm.

Example 8

A separator with a heat-resistant insulation layer was fabricated in a similar way to Example 1 except that alumina particles with $C\alpha$ of 1 were used, that the thickness of the heat-resistant insulation layer of the separator with a heat-resistant insulation layer was set at 7.9 μm, and that the ten-point average roughness of the heat-resistant insulation layer was set at 1.38 μm.

Example 9

A separator with a heat-resistant insulation layer was fabricated in a similar way to Example 8 except that the thickness of the heat-resistant insulation layer of the separator with a heat-resistant insulation layer was set at 5.3 μm, and that the ten-point average roughness of the heat-resistant insulation layer was set at 1.325 μm.

A separator with a heat-resistant insulation layer was fabricated in a similar way to Example 9 except that the ten-point average roughness of the heat-resistant insulation layer of the separator with a heat-resistant insulation layer was set at 1.58 μm.

Example 11

A separator with a heat-resistant insulation layer was fabricated in a similar way to Example 8 except that the thickness of the heat-resistant insulation layer of the separator with a heat-resistant insulation layer was set at 4.8 μm, and that the ten-point average roughness of the heat-resistant insulation layer was set at 1.48 μm.

Example 12

A separator with a heat-resistant insulation layer was fabricated in a similar way to Example 9 except that the ten-point average roughness of the heat-resistant insulation layer of the separator with a heat-resistant insulation layer was set at 1.7 μm.

Example 13

A separator with a heat-resistant insulation layer was fabricated in a similar way to Example 9 except that the ten-point average roughness of the heat-resistant insulation layer of the separator with a heat-resistant insulation layer was set at 1.749 μm.

Comparative example 1

A separator with a heat-resistant insulation layer was fabricated in a similar way to Example 1 except that alumina particles with $C_\alpha$ of 0.04 were used, and that the ten-point average roughness of the heat-resistant insulation layer of the separator with a heat-resistant insulation layer was set at 1.95 μm.

Comparative Example 2

A separator with a heat-resistant insulation layer was fabricated in a similar way to Example 9 except that the ten-point average roughness of the heat-resistant insulation layer of the separator with a heat-resistant insulation layer was set at 1.79 μm.

[Evaluation of separator] As evaluation for each of the separators with heat-resistant insulation layers, a 180° peel test was performed as follows. Results are shown in Table 1.

<180° Peel Test>

A side surface of the heat-resistant insulation layer of each of the separators with heat-resistant insulation layers, which were fabricated in Examples 1 to 13 and Comparative example 1 or 2, was reinforced by a cellophane tape (made by Nichiban Co., Ltd.), and the separator concerned was cut into pieces with a width of 10 mm and a length of approximately 150 mm. The separator with a heat-resistant insulation layer was pasted and fixed to a metal base by a double-sided adhesive tape (made by Nichiban Co., Ltd.). Thereafter, the cellophane tape on the side surface of the above-described heat-resistant insulation layer was peeled by 10 mm, and the separator concerned was attached to a measuring instrument (STA-1150; made by ORIENTEC Co., Ltd.). The above-described heat-resistant insulation layer was peeled by 80 mm under conditions where a tensile speed was 100 mm/min and a peeling distance was 80 mm, whereby peel strength thereof was measured.

TABLE 1

| | $C_\alpha$ | D [μm] | $R_{zjis}$ [μm] | $R_{zjis}/D$ | X | Peel Strength [mN/mm] |
|---|---|---|---|---|---|---|
| Example 1 | 0.07 | 5.3 | 1.45 | 0.27 | 0.019 | 35 |
| Example 2 | 0.1 | 5.3 | 1.45 | 0.27 | 0.027 | 48 |
| Example 3 | 0.15 | 5.3 | 1.45 | 0.27 | 0.041 | 55 |
| Example 4 | 0.2 | 5.3 | 1.45 | 0.27 | 0.055 | 65 |
| Example 5 | 0.33 | 8.9 | 2.97 | 0.33 | 0.110 | 83 |
| Example 6 | 0.43 | 5.3 | 1.45 | 0.27 | 0.118 | 85 |
| Example 7 | 0.68 | 5.3 | 1.46 | 0.28 | 0.187 | 92 |
| Example 8 | 1 | 7.9 | 1.38 | 0.17 | 0.175 | 112 |
| Example 9 | 1 | 5.3 | 1.325 | 0.25 | 0.250 | 81 |
| Example 10 | 1 | 5.3 | 1.58 | 0.30 | 0.298 | 77 |
| Example 11 | 1 | 4.8 | 1.48 | 0.31 | 0.308 | 80 |
| Example 12 | 1 | 5.3 | 1.7 | 0.32 | 0.321 | 65 |
| Example 13 | 1 | 5.3 | 1.749 | 0.33 | 0.330 | 58 |
| Comparative Example 1 | 0.04 | 5.3 | 1.95 | 0.37 | 0.015 | 10 |
| Comparative Example 2 | 1 | 5.3 | 1.79 | 0.34 | 0.338 | 20 |

<Results>

Figure 3:
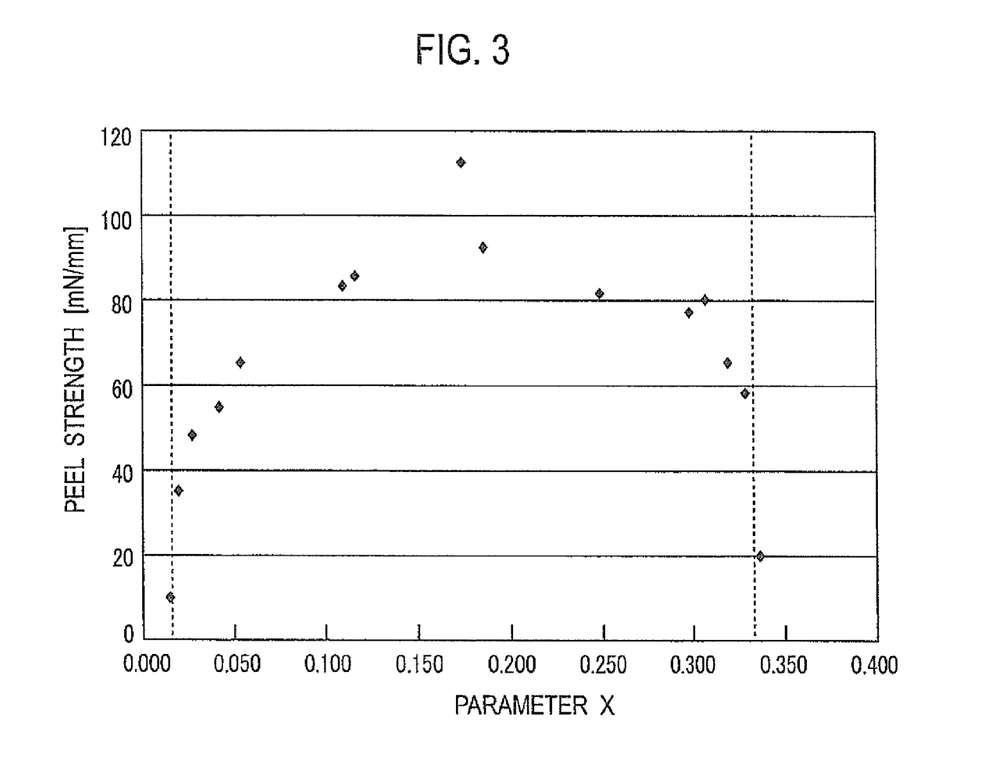
FIG. 3 is a graph showing relationships between values of a parameter X and peel strength with regard to separators fabricated in Examples and Comparative examples.

$C_\alpha$ of the respective Examples and Comparative examples, the thicknesses D of the heat-resistant insulation layers, the surface roughness $R_{zjis}$ thereof, the parameters X thereof, and measurement results of the peel strength thereof are shown in Table 1. Moreover, relationships between the parameters X and values of the peel strength are shown in FIG. 3.

In each of Examples 1 to 13, $C_\alpha$ was larger than 0.06, the parameter X was within the range of 0.018 to 0.336, and the peel strength of the heat-resistant insulation layer was larger than 30 mN/mm. Therefore, the powder fall of the heat-resistant particles of the heat-resistant insulation layer was not observed.

In each of Examples 3 to 13, $C_\alpha$ was larger than 0.11, the parameter X was within the range of 0.04 to 0.33, and the peel strength of the heat-resistant insulation layer was larger than 50 mN/mm.

In each of Examples 5 to 11, $C_\alpha$ was larger than 0.28, the parameter X was within the range of 0.07 to 0.30, and the peel strength of the heat-resistant insulation layer was larger than 70 mN/mm.

Meanwhile, in each of Comparative examples 1 and 2, the parameter X was not within the range of 0.018 to 0.336. In Comparative example 2, though $C_\alpha$ was 1, the peel strength was small, and the powder fall of the heat-resistant particles of the heat-resistant insulation layer was confirmed.

From the results described above, it was found out that it was necessary to increase the peel strength of the heat-resistant insulation layer in order to suppress the occurrence of the powder fall of the heat-resistant particles, which compose the heat-resistant insulation layer, at the time of manufacturing the separator with a heat-resistant insulation layer, and so on. Moreover, it was found out that, in order to increase the peel strength of the heat-resistant insulation layer, not only it was necessary to increase the ratio of the α alumina, which occupied the above-described heat-resistant particles, but also it was necessary to keep a balance between the thickness of the heat-resistant insulation layer and the surface roughness of the surface on the opposite side with the resin porous substrate in the heat-resistant insulation layer.

Although the present invention has been described above by reference to the embodiments and the example, the present invention is not limited to those, and it will be apparent to these skilled in the art that various modifications and improvements can be made.

In accordance with the present invention, the separator with a heat-resistant insulation layer is used, in which the α alumina was contained as the heat-resistant particles, and a balance is kept between the ratio of the α alumina, which occupies the above-described heat-resistant particles, the thickness of the heat-resistant insulation layer, and the surface roughness of the surface on the opposite side with the resin porous substrate in the heat-resistant insulation layer. Therefore, as a matter of course, it becomes possible to suppress the short circuit, which occurs in the battery, and moreover, it becomes possible to suppress the occurrence of the powder fall of the heat-resistant particles, which compose the heat-resistant insulation layer, at the time of manufacturing the separator with a heat-resistant insulation layer, and so on.

The invention claimed is:

1. A separator with a heat-resistant insulation layer, comprising:
   a resin porous substrate; and
   a heat-resistant insulation layer containing heat-resistant particles and a binder, the heat-resistant insulation layer being formed on at least one surface of the resin porous substrate,
   wherein the heat-resistant particles are alumina particles that contain α alumina,
   a mass ratio of the heat-resistant particles to the binder is 95:5,
   a secondary particle diameter of the heat-resistant particles is 500 nm to 3 μm, and
   a parameter X represented by a following mathematical expression (1) is 0.018 to 0.336:

$$X = C_\alpha \times R_{zjis}/D \qquad (1)$$

where $C_\alpha$ is a relative value of a peak area of the α alumina in a case where a peak area of a whole of the heat-resistant particles is defined as 1, the peak area being measured by an X-ray diffraction analysis, $R_{zjis}$ is a ten-point average surface roughness (μm) of a surface of the heat-resistant insulation layer, the surface opposing a surface of the resin porous substrate, and D is a thickness (μm) of the heat-resistant insulation layer, and the surface roughness $R_{zjis}$ is 1.3 to 2.97 μm.

2. The separator with a heat-resistant insulation layer according to claim 1, wherein the parameter X is 0.04 to 0.33.

3. The separator with a heat-resistant insulation layer according to claim 1, wherein the parameter X is 0.07 to 0.30.

4. The separator with a heat-resistant insulation layer according to claim 1, wherein the $C_\alpha$ is 0.06 or more.

5. The separator with a heat-resistant insulation layer according to claim 1, wherein a parameter Y represented by a following mathematical expression (2) is 5.6 to 99:

$$Y=A/B \qquad (2)$$

where A is a mass (g) of the heat-resistant particles, and B is a mass (g) of the binder.

6. An electric device, wherein the electric device is interposed between a positive electrode and a negative electrode, and includes the separator with a heat-resistant insulation layer according to claim 1.

* * * * *